United States Patent
Xu et al.

(10) Patent No.: US 10,015,707 B2
(45) Date of Patent: Jul. 3, 2018

(54) METHOD AND DEVICE FOR PROCESSING PRE-HANDOVER, UE AND CELL

(71) Applicant: ZTE Corporation, Shenzhen (CN)

(72) Inventors: Yingqi Xu, Shenzhen (CN); Yada Huang, Shenzhen (CN); Xiaojuan Shi, Shenzhen (CN); Yuqin Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/909,322

(22) PCT Filed: May 8, 2014

(86) PCT No.: PCT/CN2014/077070
§ 371 (c)(1),
(2) Date: Feb. 1, 2016

(87) PCT Pub. No.: WO2014/183588
PCT Pub. Date: Nov. 20, 2014

(65) Prior Publication Data
US 2016/0205600 A1     Jul. 14, 2016

(30) Foreign Application Priority Data
Aug. 1, 2013   (CN) .......................... 2013 1 0332678

(51) Int. Cl.
*H04W 36/00* (2009.01)
*H04W 36/36* (2009.01)

(52) U.S. Cl.
CPC ... *H04W 36/0094* (2013.01); *H04W 36/0016* (2013.01); *H04W 36/0072* (2013.01); *H04W 36/36* (2013.01)

(58) Field of Classification Search
CPC ......... H04W 36/0016; H04W 36/0072; H04W 36/0094; H04W 36/36
See application file for complete search history.

(56) References Cited

U.S. PATENT DOCUMENTS

| | | | | |
|---|---|---|---|---|
| 2008/0267127 A1* | 10/2008 | Narasimha | ........ | H04W 36/0077 370/331 |
| 2009/0156210 A1* | 6/2009 | Ponce De Leon | .... | H04W 36/30 455/436 |
| 2011/0009121 A1* | 1/2011 | Yu | .......................... | H04W 68/12 455/439 |

FOREIGN PATENT DOCUMENTS

| CN | 101562835 A | 10/2009 |
|---|---|---|
| CN | 10193205 A | 12/2010 |

(Continued)

OTHER PUBLICATIONS

International Search Report for corresponding application No. PCT/CN2014/077070 filed on May 8, 2014; dated Aug. 13, 2014.

*Primary Examiner* — Thai Vu
(74) *Attorney, Agent, or Firm* — Cantor Colburn LLP

(57) ABSTRACT

Provided are a method and device for processing pre-handover, User Equipment (UE) and a cell. The method includes that: UE receives pre-handover target cell configuration information sent by a serving cell; and the UE executes pre-handover procedure according to the pre-handover target cell configuration information. By the disclosure, the problems of low handover success rate and poor handover robustness of inter-cell handover in the related art are solved, and effects of enhancing robustness of inter-cell handover, increasing a success rate of inter-cell handover and improving network performance and a user experience are further achieved.

12 Claims, 10 Drawing Sheets

UE receives pre-handover target cell configuration information sent by a serving cell — S102

The UE executes a pre-handover procedure according to the pre-handover target cell configuration information — S104

(56) References Cited

FOREIGN PATENT DOCUMENTS

| CN | 102934479 A | 2/2013 |
|---|---|---|
| CN | 103124417 A | 5/2013 |

* cited by examiner

METHOD AND DEVICE FOR PROCESSING PRE-HANDOVER, UE AND CELL

TECHNICAL FIELD

The disclosure relates to the field of communication, and in particular to a method and device for processing pre-handover, User Equipment (UE) and a cell.

BACKGROUND

Smart phones sharply increase data service traffic when bringing interests and convenience to life of people, and particularly in a densely-populated place such as a commercial centre and a residential area, simplex cell planning has been hard to match with the sharply increasing service traffic, thereby greatly influencing user experiences. For solving these problems, a HetNet subject is proposed in the 3rd Generation Partnership Project (3GPP), that is, a small cell is additionally deployed in an existing macro cell, thereby improving capacity of a network to meet a requirement of increasing packet data traffic.

However, introduction of a small cell also brings a series of new problems, and a problem about robustness of handover between a macro cell and a small cell is one of typical problems. In related art, handover is implemented according to the following process:

Step 1: a physical layer of UE reports an internal measurement result to a Radio Resource Control (RRC) layer;

Step 2: the RRC layer performs layer-3 filtering on the internal measurement result reported by the physical layer, compares the filtered value with a reference value to judge whether event A3 is allowed to be triggered or not, and starts a Time-to-Trigger (TTT) timer when the event A3 is triggered;

Step 3: when all layer-3 filtered values reported by the physical layer fulfils with a condition of triggering the event A3 during operation of the TTT timer, the UE sends a Measurement Report (MR) to an Evolved Node B (eNodeB) after timeout of the TTT timer;

Step 4: after receiving the MR, a source cell (serving cell of the UE) initiates a handover preparation with a handover target cell in the MR, and receives a Handover Command (HO CMD) sent by the target cell through an X2 interface;

Step 5: after the handover preparation is finished, the source cell sends the HO CMD to the UE; and Step 6: after receiving the HO CMD sent by the source cell, the UE initiates a handover procedure to the handover target cell, namely initiates a random access process, and implements handover to the target cell.

In the handover procedure in the related art, long time (i.e. TTT+Time of Handover Preparation procedure, not including the time for transmitting and processing a signalling) is required from triggering of the event A3 to sending of the HO CMD. In a HetNet scenario, when UE moves from a macro cell to a small cell, signal strength of the small cell (i.e. a target cell) may rapidly increase because a cell radius of the small cell is relatively small. For UE still employing the macro cell (i.e. a source cell) as a serving cell, if waiting for a long time according to an existing protocol, the UE is likely to go deep into the small cell and may not correctly receive or receive an HO CMD sent by the source cell due to excessive interference of the small cell, thereby causing a handover failure, greatly influencing handover robustness of the UE and further influencing performance of a network. On the contrary, when UE moves from the small cell to the macro cell, the signal strength of the macro cell (i.e. the target cell) may rapidly increase because the cell radius of the small cell is relatively small. For the UE still employing the small cell (i.e. the source cell) as a serving cell, if waiting for a long time according to the existing protocol, the UE is likely to go deep into the macro cell and may not correctly receive or receive an HO CMD sent by the small cell due to excessive interference of the macro cell, thereby causing a handover failure and further influencing the performance of the network. The abovementioned conditions are more obvious when the UE moves faster.

In addition, the above handover procedure is described mainly with the event A3 as an example. In the existing protocol, besides the event A3, measurement events also include event A1, event A2, event A4, event A5, event A6, event B1 and event B2, and all of these events may also trigger handover procedure and may also face the problems in the abovementioned example.

Therefore, inter-cell handover in a related scenario has the problems of low handover success rate and poor handover robustness.

SUMMARY

A method and device for processing pre-handover, UE and a cell are provided in the disclosure, so as to at least solve the problems of low handover success rate and poor handover robustness of inter-cell handover in the related art.

According to one aspect of the disclosure, a method for processing pre-handover is provided, comprising: receiving, by User Equipment, UE, pre-handover target cell configuration information sent by a serving cell; and executing, by the UE, a pre-handover procedure according to the pre-handover target cell configuration information.

According to an example embodiment, before receiving, by the UE, the pre-handover target cell configuration information sent by the serving cell, further comprising: sending, by the UE, pre-handover indication information to the serving cell, wherein the pre-handover indication information is used for triggering the serving cell to generate and send the pre-handover target cell configuration information to the UE.

According to an example embodiment, the pre-handover indication information comprises at least one of: identification information of a neighbouring cell fulfilling a measurement event entry condition; cell type information of a neighbouring cell fulfilling a measurement event entry condition; measurement result information of a neighbouring cell fulfilling a measurement event entry condition; and measurement result information of the serving cell of the UE.

According to an example embodiment, executing, by the UE, the pre-handover procedure according to the pre-handover target cell configuration information comprises: judging whether the pre-handover target cell configuration information comprises handover time indication information or not; when a judgment result is that the pre-handover target cell configuration information comprises the handover time indication information, initiating, by the UE, the handover procedure according to the handover time indication information; and/or, when the judgment result is that the pre-handover target cell configuration information does not comprise the handover time indication information, initiating, by the UE, the handover procedure according to handover procedure initiation time determined by the UE itself.

According to an example embodiment, the handover time indication information comprises at least one of: time point information of initiation of the handover procedure and time period information of initiation of the handover procedure.

According to an example embodiment, initiating, by the UE, the handover procedure according to the handover procedure initiation time determined by the UE itself comprises: initiating the handover procedure immediately when the pre-handover target cell configuration information is received; and/or, initiating the handover procedure at handover procedure initiation time determined according to a sending condition of a Measurement Report, MR, and a receiving condition of a Handover Command, HO CMD.

According to an example embodiment, initiating the handover procedure at the handover procedure initiation time determined according to the sending condition of the MR and the receiving condition of the HO CMD comprises: judging whether the UE has sent the MR or not; and when a judgment result indicates that the UE has not sent the MR, not initiating the handover procedure.

According to an example embodiment, initiating the handover procedure at the handover procedure initiation time determined according to the sending condition of the MR and the receiving condition of the HO CMD comprises: judging whether the UE has sent the MR or not; when a judgment result indicates that the UE has sent the MR, judging whether the UE correctly receives the HO CMD or not; when a judgment result indicates that the UE correctly receives the HO CMD, initiating the handover procedure after the HO CMD is processed; and/or, when the judgment result indicates that the UE does not correctly receive the HO CMD, initiating the handover procedure according to the pre-handover target cell configuration information.

According to an example embodiment, a condition that the UE does not correctly receive the HO CMD comprises at least one of that: the UE does not receive the HO CMD within a preset time period; the UE receives the HO CMD, but does not correctly acquire an information content contained in the HO CMD.

According to aspect of the disclosure, a method for processing pre-handover is provided, comprising: executing, by a serving cell of User Equipment, UE, a handover preparation procedure; generating, by the serving cell, pre-handover target cell configuration information according to execution result information of the handover preparation procedure; and sending, by the serving cell, the pre-handover target cell configuration information to the UE, wherein the UE executes a pre-handover procedure according to the pre-handover target cell configuration information.

According to an example embodiment, before executing, by the serving cell of the UE, the handover preparation procedure, the serving cell initiates the handover preparation procedure according to at least one of the following information: the serving cell initiates the handover preparation procedure according to pre-handover indication information sent by the UE; the serving cell initiates the handover preparation procedure according to handover preparation indication information sent by neighbouring cell; the serving cell initiates the handover preparation procedure according to mobility statistic information, obtained by the serving cell through performing a mobility statistic on the UE; and the serving cell initiates the handover preparation procedure according to load information of the serving cell.

According to an example embodiment, initiating, by the serving cell, the handover preparation procedure according to the pre-handover indication information sent by the UE comprises at least one of: respectively initiating, by the serving cell, handover preparation procedures with all neighbouring cells according to neighbouring cell information comprised in the pre-handover indication information; respectively initiating, by the serving cell, handover preparation procedures with a preset number of neighbouring cells according to the neighbouring cell information comprised in the pre-handover indication information; respectively performing, by the serving cell, handover preparation procedures with a preset number of neighbouring cells with good measurement results according to neighbouring cell measurement information comprised in the pre-handover indication information; and respectively performing, by the serving cell, handover preparation procedures with a preset cell type of neighbouring cells according to neighbouring cell type information comprised in the pre-handover indication information.

According to an example embodiment, the handover preparation indication information sent by the neighbouring cell comprises at least one of: an identifier of the UE, neighbouring cell identification information of the neighbouring cell, neighbouring cell type information of the neighbouring cell, neighbouring cell signal strength information of the neighbouring cell and handover preparation triggering identification information of the neighbouring cell.

According to an example embodiment, the pre-handover target cell configuration information comprises at least one of: configuration information of the UE in each neighbouring cell finishing the handover preparation procedure with the serving cell of the UE; configuration information of the UE in a preset number of neighbouring cells finishing the handover preparation procedures with the serving cell; and time indication information of handover procedure initiation of the UE.

According to an aspect of the disclosure, a device for processing pre-handover is provided, comprising: a receiving component, configured for User Equipment, UE, to receive pre-handover target cell configuration information sent by a serving cell; and a first executing component, configured to execute a pre-handover procedure according to the pre-handover target cell configuration information.

According to an example embodiment, further comprising: a first sending component, configured for the UE to send pre-handover indication information to the serving cell, wherein the pre-handover indication information is used for triggering the serving cell to generate and send the pre-handover target cell configuration information to the UE.

According to an example embodiment, the first executing component comprises: a Judging element, configured to judge whether the pre-handover target cell configuration information comprises handover time indication information or not; a first initiating element, configured for the UE to, when a judgment result of the Judging element is that the pre-handover target cell configuration information comprises the handover time indication information, initiate a handover procedure according to the handover time indication information; and/or, a second initiating element, configured for the UE to, when the judgment result of the Judging element is that the pre-handover target cell configuration information does not comprise the handover time indication information, initiate the handover procedure according to handover procedure initiation time determined by the UE itself.

According to an example embodiment, the second initiating element comprises: a first initiating sub-element, configured to initiate the handover procedure immediately when the pre-handover target cell configuration information is received; and/or, a second initiating sub-element, configured to initiate the handover procedure at handover procedure initiation time determined according to a sending condition of a Measurement Report, MR, and a receiving condition of a Handover Command, HO CMD.

According to an example of the embodiment, a the second initiating sub-element comprises: a first secondary judging sub-element, configured to judge whether the UE has sent the MR or not; a second secondary judging sub-element, configured to, when a judgment result indicates that the UE has sent the MR, judge whether the UE correctly receives the HO CMD or not; a first secondary initiating sub-element, configured to, when a judgment result indicates that the UE correctly receives the HO CMD, initiate the handover procedure after the HO CMD is processed; and/or, a second secondary initiating sub-element, configured to, when the judgment result indicates that the UE does not correctly receive the HO CMD, initiate the handover procedure according to the pre-handover target cell configuration information.

According to an aspect of the disclosure, User Equipment, UE is provided, comprising the device according to any one of the above devices.

According to an aspect of the disclosure, a device for processing pre-handover is provided, comprising: a second executing component, configured for a serving cell of User Equipment, UE, to execute a handover preparation procedure; a generating component, configured for the serving cell to generate pre-handover target cell configuration information according to execution result information of the handover preparation procedure; and a second sending component, configured for the serving cell to send the pre-handover target cell configuration information to the UE, wherein the UE executes a pre-handover procedure according to the pre-handover target cell configuration information.

According to an example embodiment, further comprising at least one of: a first initiating component, configured for the serving cell to initiate the handover preparation procedure according to pre-handover indication information sent by the UE; a second initiating component, configured for the serving cell to initiate the handover preparation procedure according to handover preparation indication information sent by a neighbouring cell; a third initiating component, configured for the serving cell to initiate the handover preparation procedure according to mobility statistic information, obtained by the serving cell through performing a mobility statistic on the UE; and a fourth initiating component, configured for the serving cell to initiate the handover preparation procedure according to load information of the serving cell.

According to an example embodiment, the first initiating component comprises at least one of: a third initiating element, configured for the serving cell to respectively initiate handover preparation procedures with all neighbouring cells according to neighbouring cell information comprised in the pre-handover indication information; a fourth initiating element, configured for the serving cell to respectively initiate handover preparation procedures with a preset number of neighbouring cells according to the neighbouring cell information comprised in the pre-handover indication information; a fifth initiating element, configured for the serving cell to respectively perform handover preparation procedures with a preset number of neighbouring cells with good measurement results according to neighbouring cell measurement information comprised in the pre-handover indication information; and a sixth initiating element, configured for the serving cell to respectively perform handover preparation procedures with a preset cell type of neighbouring cells according to neighbouring cell type information comprised in the pre-handover indication information.

According to an aspect of the disclosure, a cell is provided, comprising any one of the above devices.

According to the disclosure, the UE receives the pre-handover target cell configuration information sent by the serving cell; and the UE executes the handover procedure according to the pre-handover target cell configuration information, so that the problems of low handover success rate and poor handover robustness of inter-cell handover in the related art are solved, and effects of enhancing robustness of inter-cell handover, increasing the success rate of inter-cell handover and improving the network performance and the user experience are further achieved.

BRIEF DESCRIPTION OF THE DRAWINGS

The drawings described here are adopted to provide further understanding of the disclosure, and form a part of the disclosure. Schematic embodiments of the disclosure and description thereof are adopted to explain the disclosure and not intended to form improper limits to the disclosure. In the drawings.

DETAILED DESCRIPTION OF THE EMBODIMENTS

The disclosure is described below with reference to the drawings and embodiments in detail. It is important to note that the embodiments in the disclosure and characteristics in the embodiments can be combined under the condition of no conflicts.

Figure 1:
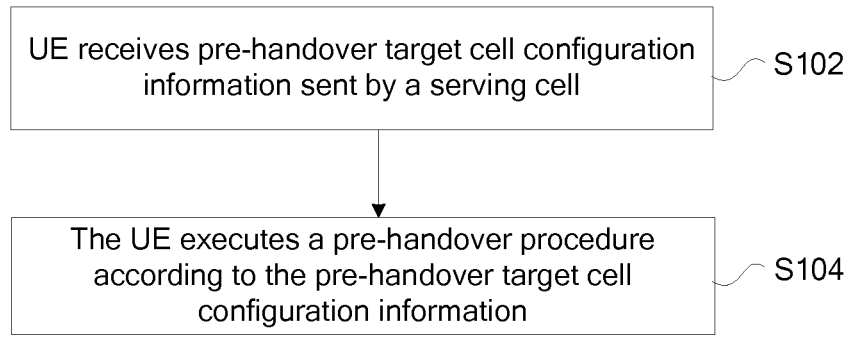
FIG. 1 is a flowchart of a first method for processing pre-handover according to an embodiment of the disclosure.

A method for processing pre-handover is provided in the embodiment. FIG. 1 is a flowchart of a first method for processing pre-handover according to an embodiment of the disclosure, and as shown in FIG. 1, the flow includes the following steps:

Step 102: UE receives pre-handover target cell configuration information sent by a serving cell; and Step 104: the UE executes a pre-handover procedure according to the pre-handover target cell configuration information.

By the steps, pre-handover procedure is performed according to the pre-handover target cell configuration information. Compared with a handover procedure flow in the related art, the pre-handover procedure is executed according to a related configuration of the pre-handover target cell configuration information, thereby not requiring to implement the handover operation flow according to the handover procedure flow in the related art, so that waiting for a relatively long time in the flow is avoided, the problems of the low handover success rate and the poor handover robustness of inter-cell handover in the related art are solved, and effects of enhancing robustness of inter-cell handover, increasing a success rate of inter-cell handover and improving network performance and the user experience are further achieved.

Before Step 102, the UE may send pre-handover indication information to the serving cell to enable the serving cell to generate and send the pre-handover target cell configuration information to the UE. Wherein, the pre-handover indication information is used for triggering the serving cell to generate and send the pre-handover target cell configuration information to the UE. The pre-handover indication information may include at least one of: identification information of a neighbouring cell fulfilling a measurement event entry condition; cell type information of the neighbouring cell fulfilling the measurement event entry condition; measurement result information of the neighbouring cell fulfilling the measurement event entry condition; and measurement result information of the serving cell of the UE.

In an example embodiment, when the UE executes the pre-handover procedure according to the pre-handover target cell configuration information, the following processing manner may be adopted: firstly, whether the pre-handover target cell configuration information includes handover time indication information or not is judged; under the condition that a judgment result is that the pre-handover target cell configuration information includes handover time indication information, a handover procedure is initiated according to the handover time indication information; and/or, under the condition that the judgment result is that the pre-handover target cell configuration information does not include handover time indication information, the UE initiates the handover procedure according to handover procedure initiation time determined by the UE itself. Wherein, the handover time indication information includes at least one of: time point information of initiation of the handover procedure and time period information of initiation of the handover procedure.

In an optional embodiment, when it is determined that the pre-handover target cell configuration information does not include the handover time indication information, the step that the UE initiates the handover procedure according to the handover procedure initiation time determined by the UE itself may be implemented by the following processing: the handover procedure is initiated immediately when the pre-handover target cell configuration information is received; and/or, the handover procedure is initiated at handover procedure initiation time determined according to a sending condition of an MR and a receiving condition of an HO CMD.

In an optional embodiment, the step that the handover procedure is initiated at the handover procedure initiation time determined according to the sending condition of the MR and the receiving condition of the HO CMD may include that: whether the UE has sent the MR or not is judged at first; under the condition that a judgment result indicates that the UE has not sent the MR, the UE does not initiate the handover procedure; under the condition that the judgment result indicates that the UE has sent the MR, whether the UE correctly receives the HO CMD or not is judged; under the condition that a judgment result indicates that the UE correctly receives the HO CMD, the handover procedure is initiated after the HO CMD is processed; and/or, under the condition that the judgment result indicates that the UE does not correctly receive the HO CMD, the handover procedure is initiated according to the pre-handover target cell configuration information. It is important to note that the handover procedure is initiated according to configuration information configured for the handover procedure in the pre-handover target cell configuration information.

In an optional embodiment, the condition that the UE does not correctly receive the HO CMD may include at least one of that: the UE does not receive the HO CMD within a preset time period; the UE receives the HO CMD, but does not correctly acquire an information content included in the HO CMD.

Figure 2:
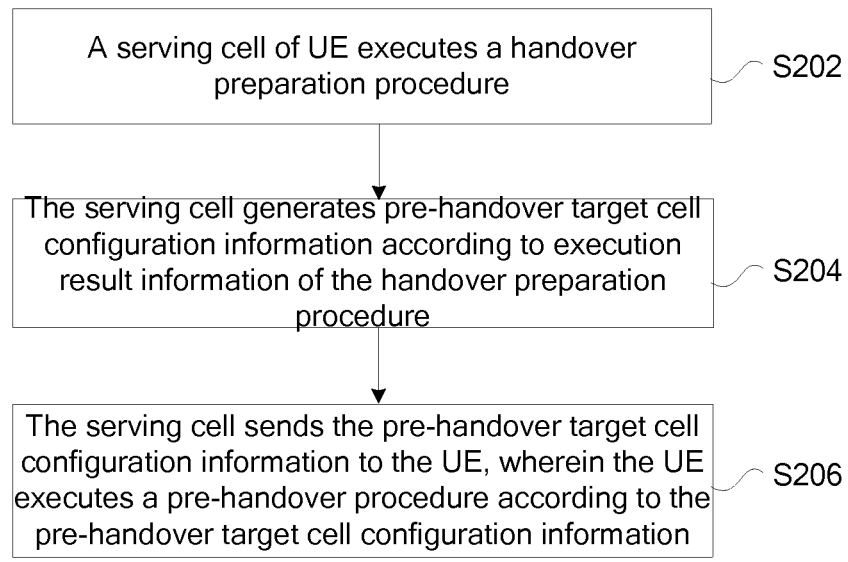
FIG. 2 is a flowchart of a second method for processing pre-handover according to an embodiment of the disclosure.

A method for processing pre-handover is further provided in the embodiment. FIG. 2 is a flowchart of a second method for processing pre-handover according to an embodiment of the disclosure, and as shown in FIG. 2, the flow includes the following steps:

Step 202: a serving cell of UE executes a handover preparation procedure;

Step 204: the serving cell generates pre-handover target cell configuration information according to execution result information of the handover preparation procedure; and Step 206: the serving cell sends the pre-handover target cell configuration information to the UE, wherein the UE executes a pre-handover procedure according to the pre-handover target cell configuration information.

By the steps, the serving cell of the UE generates the pre-handover target cell configuration information according to the execution result information of the handover preparation procedure; the UE executes the pre-handover procedure according to the pre-handover target cell configuration information. Compared with a handover procedure flow in the related art, the pre-handover procedure is executed according to a related configuration of the pre-handover target cell configuration information, thereby not requiring to be implemented only according to the handover procedure flow in the related art, so that waiting for a relatively long time in the flow is avoided, the problems of low handover success rate and poor handover robustness of inter-cell handover in the related technology are solved, and effects of enhancing robustness of inter-cell handover, increasing the success rate of inter-cell handover and improving network performance and the user experience are further achieved.

In an optional embodiment, before the step that the serving cell of the UE executes the handover preparation procedure, the serving cell may initiate the handover preparation procedure according to at least one of the following information: the serving cell initiates the handover preparation procedure according to pre-handover indication information sent by the UE; the serving cell initiates the handover preparation procedure according to handover preparation indication information sent by a neighbouring cell; the serving cell initiates the handover preparation procedure according to mobility statistic information, obtained by of the serving cell through performing a mobility statistic on the UE; and the serving cell initiates the handover preparation procedure according to load information of the serving cell.

Wherein, the step that the serving cell initiates the handover preparation procedure according to the pre-handover indication information sent by the UE may include at least one of: the serving cell respectively initiates handover preparation procedures with all neighbouring cells according to neighbouring cell information included in the pre-handover indication information; the serving cell respectively initiates handover preparation procedures with a preset number of neighbouring cells according to the neighbouring cell information included in the pre-handover indication information; the serving cell performs respectively handover preparation procedures with a preset number of neighbouring cells with good measurement results according to neighbouring cell measurement information included in the pre-handover indication information; and the serving cell performs respectively handover preparation procedures with a preset cell type of neighbouring cells according to neighbouring cell type information included in the pre-handover indication information.

In an optional embodiment, the handover preparation indication information sent by the neighbouring cell may include at least one of: an identifier of the UE, neighbouring cell identification information of the neighbouring cell, neighbouring cell type information of the neighbouring cell, neighbouring cell signal strength information of the neighbouring cell and handover preparation triggering identification information of the neighbouring cell. Wherein, the handover preparation triggering identification information is mainly configured to indicate to the serving cell of the UE that information such as the neighbouring cell identification information, the neighbouring cell type information and the neighbouring cell signal strength information are used for pre-handover procedure, or indicate that signalling including all the information is used for pre-handover procedure.

Wherein, the pre-handover indication information may include at least one of: identification information of one or more neighbouring cells fulfilling a measurement event entry condition; cell type information of the neighbouring cell fulfilling the measurement event entry condition; measurement result information of the one or more neighbouring cells fulfilling the measurement event entry condition; and measurement result information of the serving cell of the UE.

In an optional embodiment, the pre-handover target cell configuration information may include at least one of: configuration information of the UE in each neighbouring cell finishing the handover preparation procedure with the serving cell of the UE; configuration information of the UE in a preset number of neighbouring cells finishing the handover preparation procedures with the serving cell; and time indication information of handover procedure initiation of the UE.

A device for processing pre-handover is provided in the embodiment. The device is configured to implement the abovementioned embodiment and optional implementation modes, and that what has been described will not be elaborated. For example, term "component", used below, is a combination of software and/or hardware capable of realizing a preset function. The device described in the following embodiment is preferably implemented by software, but implementation of the device with hardware or the combination of software and hardware is also possible and conceived.

Figure 3:
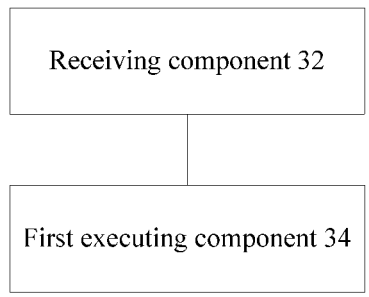
FIG. 3 is a structure diagram of a first device for processing pre-handover according to an embodiment of the disclosure.

FIG. 3 is a structure diagram of a first device for processing pre-handover according to an embodiment of the disclosure, and as shown in FIG. 3, the device includes a receiving component 32 and a first executing component 34. The device is described below.

The receiving component 32 is configured for UE to receive pre-handover target cell configuration information sent by a serving cell; and the first executing component 34 is connected to the receiving component 32, and is configured to execute a pre-handover procedure according to the pre-handover target cell configuration information.

Figure 4:
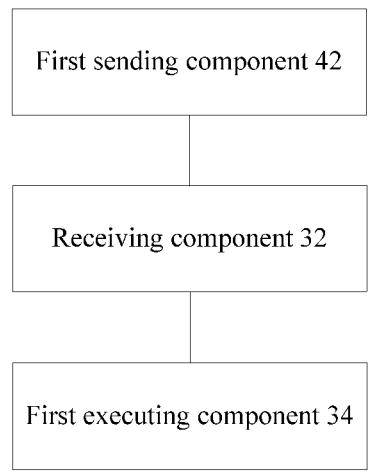
FIG. 4 is an example structure diagram of the first device for processing the pre-handover according to an embodiment of the disclosure.

FIG. 4 is an example structure diagram of the first device for processing the pre-handover according to an embodiment of the disclosure, and as shown in FIG. 4, the device also includes a first sending component 42, besides the structure shown in FIG. 3. The first sending component 42 is described below.

The first sending component 42 is connected to the receiving component 32, and is configured for the UE to send pre-handover indication information to the serving cell, wherein the pre-handover indication information is used for triggering the serving cell to generate and send the pre-handover target cell configuration information to the UE.

Figure 5:
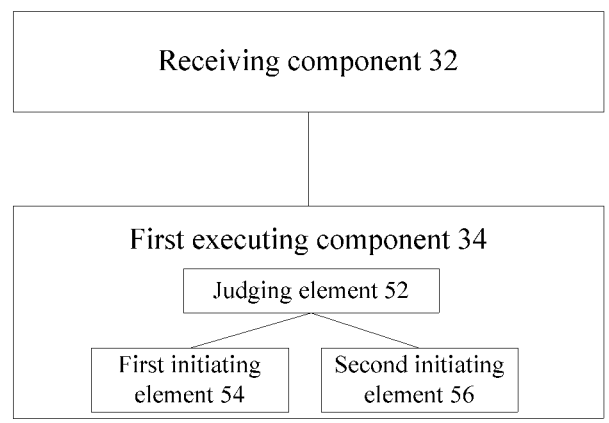
FIG. 5 is an example structure diagram of the first executing component 34 in the first device for processing the pre-handover procedure device according to an embodiment of the disclosure.

FIG. 5 is an example structure diagram of the first executing component 34 in the first device for processing the pre-handover according to an embodiment of the disclosure, and as shown in FIG. 5, the first executing component 34 includes: a Judging element 52, a first initiating element 54 and/or a second initiating element 56. The first executing component 34 is described below.

The Judging element 52 is configured to judge whether the pre-handover target cell configuration information includes handover time indication information or not; the first initiating element 54 is connected to the Judging element 52, and is configured for the UE to, under the condition that a judgment result of the Judging element 52 is that the pre-handover target cell configuration information includes the handover time indication information, initiate a handover procedure according to the handover time indication information; and/or, the second initiating element 56 is connected to the Judging element 52, and is configured for the UE to, under the condition that the judgment result of the Judging element 52 is the pre-handover target cell configuration information does not include the handover time indication information, initiate the handover procedure according to handover procedure initiation time determined by the UE itself.

Figure 6:
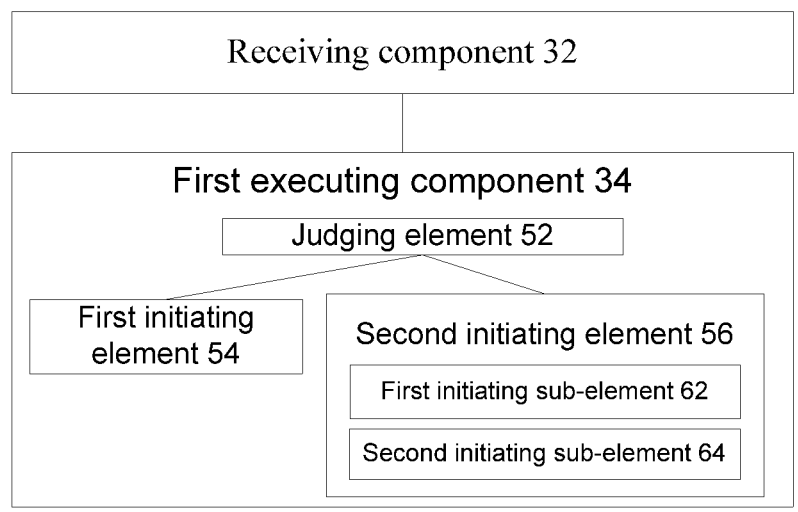
FIG. 6 is an example structure diagram of the second initiating element 56 in the first executing component 34 in the device for processing the pre-handover according to an embodiment of the disclosure.

FIG. 6 is an example structure diagram of the second initiating element 56 in the first executing component 34 in the first device for processing the pre-handover according to an embodiment of the disclosure, and as shown in FIG. 6, the second initiating element 56 includes: a first initiating sub-element 62, and/or a second initiating sub-element 64. The second initiating element 56 is described below.

The first initiating sub-element 62 is configured to initiate the handover procedure immediately when the pre-handover target cell configuration information is received; and the second initiating sub-element 64 is configured to initiate the handover procedure at handover procedure initiation time determined according to a sending condition of an MR and a receiving condition of an HO CMD.

Figure 7:
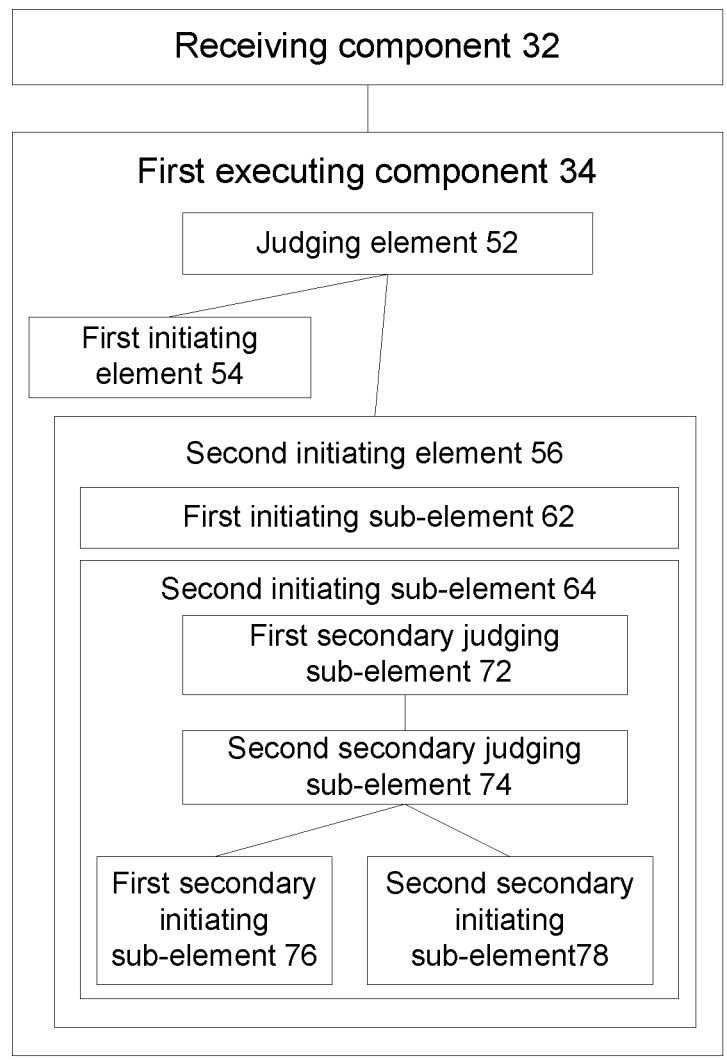
FIG. 7 is an example structure diagram of the second initiating sub-element 64 in the second initiating element 56 in the first executing component 34 in the first device for processing the pre-handover according to an embodiment of the disclosure.

FIG. 7 is an example structure diagram of the second initiating sub-element 64 in the second initiating element 56 in the first executing component 34 in the first device for processing the pre-handover according to an embodiment of the disclosure, and as shown in FIG. 7, the second initiating sub-element includes: a first secondary judging sub-element 72, a second secondary judging sub-element 74, a first secondary initiating sub-element 76 and/or a second secondary initiating sub-element 78. The second initiating sub-element 64 is described below.

The first secondary judging sub-element 72 is configured to judge whether the UE has sent the MR or not; the second secondary judging sub-element 74 is connected to the first secondary judging sub-element 72, and is configured to, under the condition that a judgment result indicates that the UE has sent the MR, judge whether the UE correctly receives the HO CMD or not; the first secondary initiating sub-element 76 is connected to the second secondary judging sub-element 74, and is configured to, under the condition that a judgment result indicates that the UE correctly receives the HO CMD, initiate the handover procedure after the HO CMD is processed; and the second secondary initiating sub-element 78 is connected to the second secondary judging sub-element 74, and is configured to, under the condition that the judgment result indicates that the UE does not correctly receive the HO CMD, initiate the handover procedure according to the pre-handover target cell configuration information.

Figure 8:
FIG. 8 is a first structure diagram of UE according to an embodiment of the disclosure.

UE is further provided in the embodiment. FIG. 8 is a first structure diagram of UE according to an embodiment of the disclosure, and as shown in FIG. 8, the UE 80 includes the abovementioned first pre-handover procedure device 82 in any item.

Figure 9:
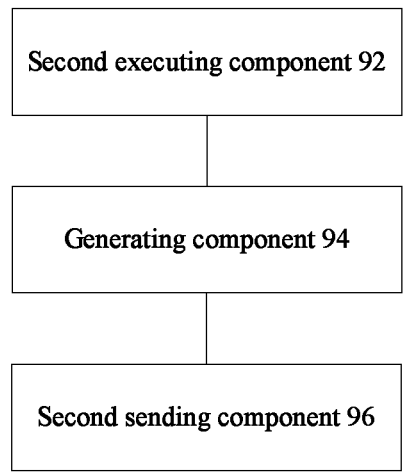
FIG. 9 is a structure diagram of a second device for processing pre-handover according to an embodiment of the disclosure.

The device for processing pre-handover is further provided in the embodiment. FIG. 9 is a structure diagram of a second device for processing the pre-handover according to an embodiment of the disclosure, and as shown in FIG. 9, the device includes a second executing component 92, a generating component 94 and a second sending component 96. The device is described below.

The second executing component 92 is configured for a serving cell of UE to execute a handover preparation procedure; the generating component 94 is connected to the second executing component 92, and is configured for the serving cell to generate pre-handover target cell configuration information according to execution result information of the handover preparation procedure; and the second sending component 96 is configured for the serving cell to send the pre-handover target cell configuration information to the UE, wherein the UE executes a pre-handover procedure according to the pre-handover target cell configuration information.

Figure 10:
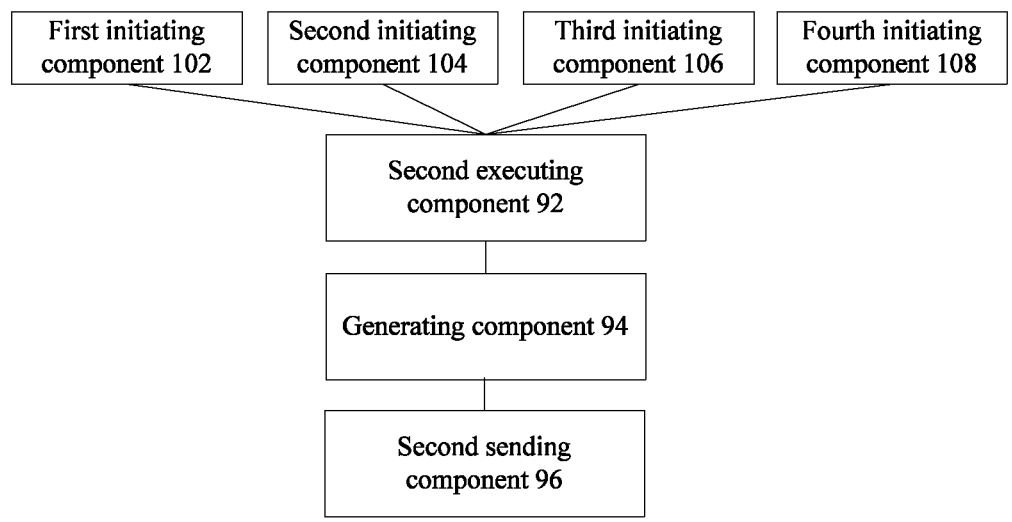
FIG. 10 is an example structure diagram of the second device for processing the pre-handover according to an embodiment of the disclosure.

FIG. 10 is an example structure diagram of the second device for processing the pre-handover according to an embodiment of the disclosure, and as shown in FIG. 10, the device, besides all the structures shown in FIG. 9, further includes at least one of: a first initiating component 102, a second initiating component 104, a third initiating component 106 and a fourth initiating component 108. The device is described below.

The first initiating component 102 is connected to the second executing component 92, and is configured for the serving cell to initiate the handover preparation procedure according to pre-handover indication information sent by the UE; the second initiating component 104 is connected to the second executing component 92, and is configured for the serving cell to initiate the handover preparation procedure according to handover preparation indication information sent by a neighbouring cell; the third initiating component 106 is connected to the second executing component 92, and is configured for the serving cell to initiate the handover preparation procedure according to mobility statistic information, obtained by the serving cell through performing a mobility statistic on the UE; and the fourth initiating component 108 is connected to the second executing component 92, and is configured for the serving cell to initiate the handover preparation procedure according to load information of the serving cell.

Figure 11:
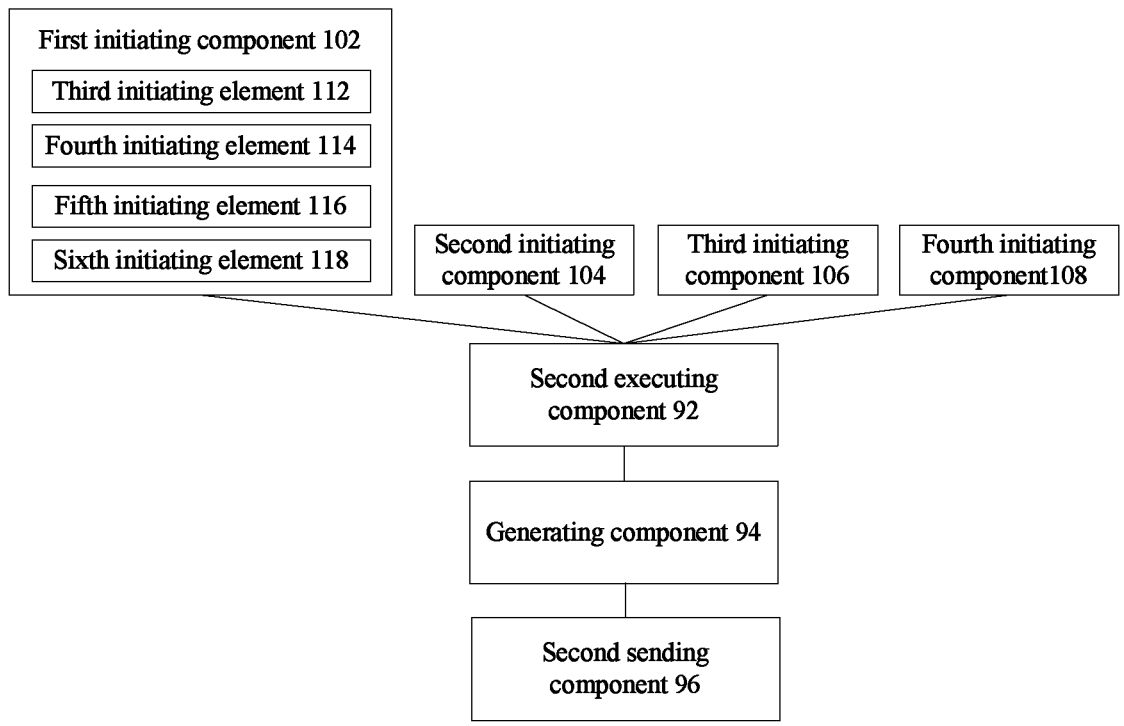
FIG. 11 is an example structure diagram of the first initiating component 92 in the second device for processing the pre-handover according to an embodiment of the disclosure.

FIG. 11 is an example structure diagram of the first initiating component 102 in the second device for processing the pre-handover according to an embodiment of the disclosure, and as shown in FIG. 11, the first initiating component 102 includes at least one of: a third initiating element 112, a fourth initiating element 114, a fifth initiating element 116 and a sixth initiating element 118. The first initiating component 102 is described below.

The third initiating element 112 is configured for the serving cell to initiate respectively handover preparation procedures with all neighbouring cells according to neighbouring cell information included in the pre-handover indication information; the fourth initiating element 114 is configured for the serving cell to initiate respectively handover preparation procedures with a preset number of neighbouring cells according to the neighbouring cell information included in the pre-handover indication information; the fifth initiating element 116 is configured for the serving cell to perform respectively handover preparation procedures with a preset number of neighbouring cells with good measurement results according to neighbouring cell measurement information included in the pre-handover indication information; and the sixth initiating element 118 is configured for the serving cell to perform respectively handover preparation procedures with a cell type of neighbouring cells according to neighbouring cell type information included in the pre-handover indication information.

Figure 12:
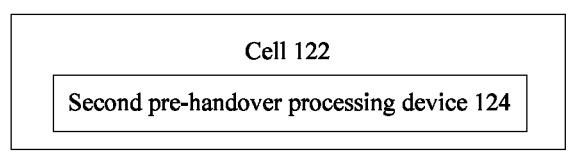
FIG. 12 is a structure diagram of a cell according to an embodiment of the disclosure.

A cell is further provided in the embodiment. FIG. 12 is a structure diagram of a cell according to an embodiment of the disclosure, and as shown in FIG. 12, the cell 122 includes any one of the abovementioned second devices for processing the pre-handover 124.

As for the problems about success rate and robustness of handover in the related art, a novel method for processing a inter-cell handover is provided in the embodiment, which not only solves the problem of high failure rate of handover between a macro cell and a small cell, but also facilitates improvement in robustness of inter-cell handover and ensures overall performance of a network and a user experience. The method is described below.

The method for processing the pre-handover provided by the embodiment includes that: UE receives pre-handover target cell configuration information, determines handover procedure initiation time and initiates a handover procedure, wherein the UE may send pre-handover indication information to a serving cell, thereby enabling the serving cell to generate and send the pre-handover target cell configuration information.

In an optional embodiment, at least one of the following manners is adopted for the step that the UE "determines the handover procedure initiation time": the UE determines a specific time point or time period when the handover procedure is initiated according to handover time indication information sent by a network, or autonomously determines the handover procedure initiation time according to the handover time indication information; and the UE autonomously determines the handover procedure initiation time, and initiates handover.

Wherein, the "autonomously determined handover procedure initiation time" may include the following conditions: the UE may initiate the handover procedure immediately when receiving the pre-handover target cell configuration information, and the UE may also judge whether to and when to initiate the handover procedure according to a sending condition of an MR and a receiving condition of an HO CMD.

In an optional embodiment, the following processing manner may be adopted for the step that the UE "judges whether to and when to initiate the handover procedure according to the sending condition of the MR and the receiving condition of the HO CMD":

when the UE has not sent the MR, the UE may not initiate the handover procedure according to the pre-handover target cell configuration information;

when the UE has sent the MR, the handover procedure may be initiated according to the following method: when the UE correctly receives the HO CMD, the handover procedure is initiated immediately according to the HO CMD; and when the UE does not correctly receive the HO CMD, the handover procedure is initiated according to the pre-handover target cell configuration information. Wherein, the condition that "the UE does not correctly receive the HO CMD" includes at least one of that: the UE does not receive the HO CMD within a preset time; and the UE receives the HO CMD, but does not correctly acquire a content included in the HO CMD.

In an optional embodiment, the pre-handover indication information sent to the serving cell by the UE may include at least one of: an identifier of one or more neighbouring cells fulfilling a measurement event entry condition; the cell type of the one or more neighbouring cells fulfilling the measurement event entry condition; measurement result information of the one or more neighbouring cells fulfilling the measurement event entry condition; and measurement result information of the serving cell, wherein the measurement result information may be neighbouring cell information of the serving cell, and may also be some parameter information of the serving cell.

A method for processing pre-handover is provided in the embodiment, which includes that: a serving cell initiates and executes a handover preparation procedure, and generates and sends pre-handover target cell configuration information, wherein handover preparation procedure initiation and execution of the serving cell may be triggered by at least one of the following conditions: the serving cell may initiate the handover preparation procedure according to pre-handover indication information sent by UE, the serving cell may also initiate the handover preparation procedure according to handover preparation indication information sent by a neighbouring cell, the serving cell may also initiate the handover preparation procedure according to mobility statistic information, obtained by of the serving cell through performing a mobility statistic on the UE, and the serving cell may further initiate the handover preparation procedure according to load of the serving cell.

In an optional embodiment, at least one of the following manners may be adopted for initiation of the handover preparation procedure according to the pre-handover indication information sent by the UE: the serving cell respectively initiates handover preparation procedures with all neighbouring cells according to neighbouring cell information included in the pre-handover indication information; the serving cell respectively initiates handover preparation procedures with a preset number of neighbouring NodeBs according to the neighbouring cell information included in the pre-handover indication information; the serving cell performs respectively handover preparation procedures with a preset number of neighbouring cells with optimal measurement results according to neighbouring cell measurement information included in the pre-handover indication information; and the serving cell performs respectively handover preparation procedures with a specific type of neighbouring cells according to a neighbouring cell type included in the pre-handover indication information.

Wherein, the "handover preparation indication information sent by the neighbouring cell" may include at least one of: an identifier of the UE; an identifier of the neighbouring cell; a type of the neighbouring cell; signal strength information of the neighbouring cell; and a handover preparation triggering identifier. Wherein, the handover preparation triggering identifier is mainly configured to indicate to the serving cell of the UE that the information such as the identifier of the neighbouring cell, the type of the neighbouring cell and the signal strength information of the neighbouring cell are used for pre-handover procedure, or indicate that signalling including all the information are used for pre-handover procedure.

In an optional embodiment, the "pre-handover target cell configuration information" may include at least one of the following contents: configuration information of the UE in each neighbouring cell finishing the handover preparation procedure with the serving cell; configuration information of the UE in a preset number of neighbouring cells finishing the handover preparation procedures with the serving cell and with optimal measurement results; and time indication information of handover operation initiation of the UE.

Wherein, the "time indication information of handover operation initiation of the UE" is a specific time point and time period when the UE initiates the handover procedure, or indicates the UE to autonomously determine handover procedure initiation time.

By the abovementioned embodiment and example implementation mode, inter-cell handover robustness may be enhanced, and a success rate of handover of the UE between the macro cell and the small cell may be increased, so that the performance of the network is improved, and the user experience is ensured.

The example embodiment of the embodiment of the disclosure is described below with reference to the drawings.

Figure 13:
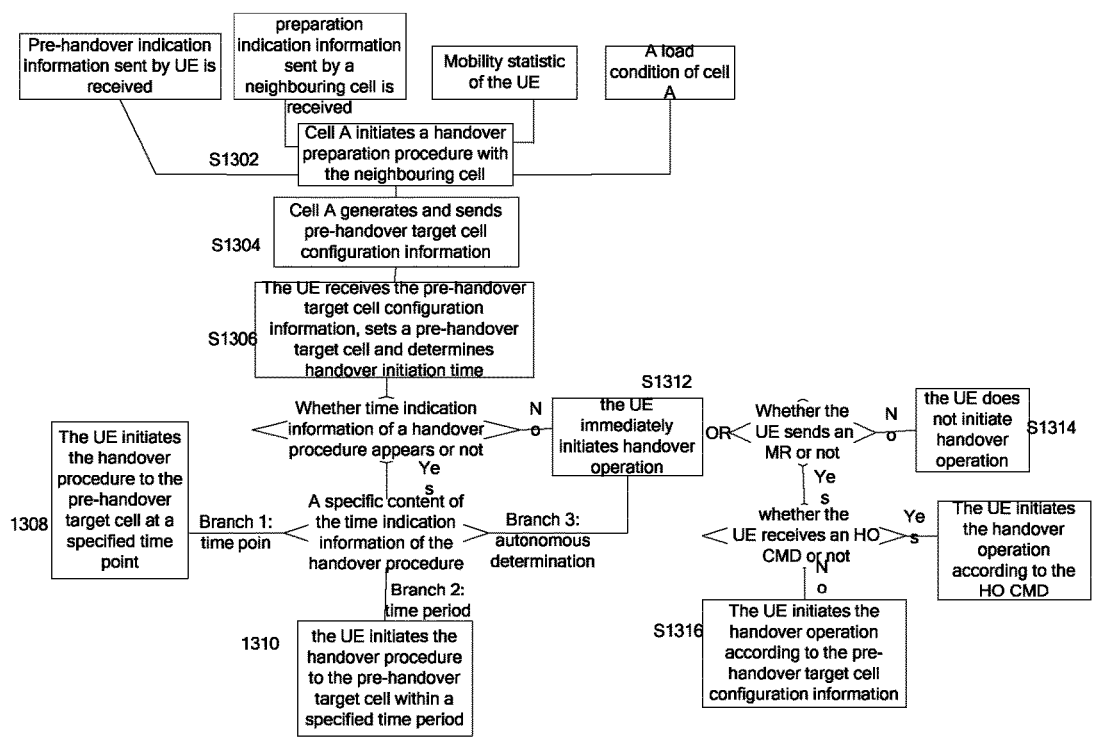
FIG. 13 is a flowchart of a method for processing pre-handover according to an example embodiment of the disclosure.

FIG. 13 is a flowchart of a method for processing pre-handover according to an example embodiment of the disclosure, and as shown in FIG. 13, the method includes the following steps.

It is important to note first that UE is located in cell A and cell A is a serving cell of the UE in the example implementation mode.

Step 1302: cell A initiates a handover preparation procedure with a neighbouring cell.

In the example implementation mode, cell A may initiate the handover preparation procedure with the neighbouring cell under at least one of the following conditions: cell A receives pre-handover indication information sent by the UE; cell A receives handover preparation indication information sent by the neighbouring cell; cell A judges that the handover preparation procedure should be initiated according to mobility statistic information, determined by cell A through performing a mobility statistic on the UE; and cell A determines that the handover preparation procedure should be initiated according to load condition of cell A.

In the example implementation mode, when cell A receives the pre-handover indication information sent by the UE, according to neighbouring cell information included in the indication information, cell A may initiate handover preparation procedures with all neighbouring cells respectively, or initiate handover preparation procedures with a preset number of neighbouring cells with highest signal quality, or initiate handover preparation procedures with a specific type of neighbouring cells. When cell A receives the handover preparation indication information sent by the neighbouring cell, cell A initiates the handover preparation procedure with the neighbouring cell according to the indication information. When determining that the handover preparation procedure should be initiated according to the mobility statistic information, obtained by cell A through performing a mobility statistic on the UE, cell A initiates the handover preparation procedure with a determined probable pre-handover target cell of the UE. When determining that the handover preparation procedure should be initiated according to load condition of cell A, cell A initiates the handover preparation procedure with a cell which is adjacent to the UE and lightly loaded.

In the example implementation mode, the pre-handover indication information sent by the UE may include at least one of: an identifier of a neighbouring cell fulfilling an event A3 entry condition; a type of the neighbouring cell fulfilling the event A3 entry condition; measurement result information of the neighbouring cell fulfilling the event A3 entry condition; and measurement result information of cell A.

In the example implementation mode, the handover preparation indication information sent by the neighbouring cell may be one or any combination of the following contents: an identifier of the UE; an identifier of the neighbouring cell; a type of the neighbouring cell; signal strength information of the neighbouring cell; and a handover preparation triggering identifier.

Step 1304: cell A generates and sends pre-handover target cell configuration information.

In the example implementation mode, after finishing the handover preparation procedure with the neighbouring cell, cell A generates the pre-handover target cell configuration information according to the information acquired from the neighbouring cell, and sends the pre-handover target cell configuration information to the UE. Wherein, the pre-handover target cell configuration information may be one or any combination of the following contents: configuration information of the UE in each neighbouring cell finishing the handover preparation procedure with cell A; configuration information of the UE in a preset number of neighbouring cells finishing the handover preparation procedures with the serving cell and with optimal measurement results; and time indication information of handover procedure initiation of the UE.

Wherein, the time indication information of handover procedure initiation of the UE may be a specific time point and time period, and may also indicate the UE to autonomously determine specific handover procedure initiation time.

Step 1306: the UE receives the pre-handover target cell configuration information, sets a pre-handover target cell, and determines handover initiation time.

In the example implementation mode, when the pre-handover target cell configuration information includes only configuration of one cell, the UE sets the cell as the pre-handover target cell; and when the pre-handover target cell configuration information includes configuration of more than one cell, the UE randomly selects one from the more than one cell as the pre-handover target cell, or selects the cell with the highest signal strength as the pre-handover target cell according to quality of a measurement signal.

In the example implementation mode, when the time indication information of the handover procedure in the pre-handover target cell configuration information specifies a specific time point, the UE initiates handover operation at the specific time point, namely executes Step 1308; when a specific time period is specified, the UE initiates the handover procedure within the time period, namely executes Step 1310; and when the UE is indicated to autonomously determine the handover initiation time, or there is no time indication information of the handover procedure in the pre-handover target cell, the UE immediately initiates the handover operation, namely executes Step 1312, or judges whether to initiate the handover operation or not and when to execute the handover procedure according to a sending condition of an MR and a receiving condition of an HO CMD: when the UE has not sent the MR, Step 1314 is executed, and when the UE has sent the MR, Step 1316 is executed.

Step 1308: the UE initiates the handover procedure to the pre-handover target cell at the time point specified by a network.

Step 1310: the UE initiates the handover procedure to the pre-handover target cell within the time period specified by the network.

Step 1312: the UE initiates the handover procedure to the pre-handover target cell immediately when receiving the pre-handover target cell configuration information.

Step 1314: when the UE has not sent the MR, the UE may not initiate the handover operation.

In the example implementation mode, the UE has not sent the MR all the time, that is, measurement results, obtained by the UE, of all the neighbouring cells don't always fulfill the event A3 entry condition during operation of a TTT timer, the UE does not initiate the handover procedure, that is, the UE may not initiate the handover procedure according to the pre-handover target cell configuration information.

Step 1316: the UE has sent the MR, and initiates the handover procedure according to a receiving result of the HO CMD.

In the example implementation mode, the UE finally sends the MR, that is, at least one of the measurement results, obtained by the UE, of all the neighbouring cells always fulfill the event A3 entry condition during operation of the TTT timer, the UE waits to receive the HO CMD:

when the UE receives the HO CMD, the UE initiates the handover procedure according to the HO CMD; when the UE does not correctly receive the HO CMD: when a pre-handover target cell included in the MR is also included in the pre-handover target cell configuration information, the UE determines the cell as the target cell, and initiates the handover procedure according to a content included in the pre-handover target cell configuration information; or, the UE initiates the handover procedure to a pre-handover target cell which is set before according to the pre-handover target cell configuration information.

In the example implementation mode, after receiving the MR sent by the UE, a NodeB of cell A may execute the handover preparation procedure and send the HO CMD according to a result, wherein the handover preparation procedure may include at least one of the following two conditions: the first condition is that, when neighbouring cell information included in the MR is overlapped with the neighbouring cell information included in the pre-handover indication information, for the overlapped neighbouring cell information, the NodeB of cell A may not execute a new handover preparation procedure but generate the HO CMD according to the result of the handover preparation procedure in the pre-handover procedure; and the second condition is that, no matter whether the neighbouring cell information included in the MR is overlapped with the neighbouring cell information included in the pre-handover indication information or not, the NodeB of cell A may initiate a new handover preparation procedure according to the neighbouring cell information in the MR and generate the HO CMD according to the result of the process.

Wherein, the condition that the UE does not correctly receive the HO CMD may be at least one of the following conditions: the UE does not receive the HO CMD within a preset time; and the UE receives the HO CMD, but does not correctly acquire a content included in the HO CMD.

In the example implementation mode, a UE context acquired by the NodeB of the cell involved in the handover preparation procedure in the pre-handover procedure and a resource reserved for the UE may be processed in at least one of the following manners: manner 1, the NodeB of the cell involved in the pre-handover procedure keeps the UE context and the resource reserved for the UE within a preset time, and after the preset time, the cell releases the reserved resource and deletes the UE context, or only releases the reserved resource, but keeps the UE context; and manner 2, after the UE finishes the handover procedure and enters the new cell, its source cell sends indication information to cells, except the current serving cell of the UE, involved in the pre-handover procedure. After receiving the indication information, these cells release the reserved resource and delete the UE context, or only release the reserved resource, but keep the UE context.

The Example implementation modes of pre-handover procedure are described below with reference to the example embodiment.

Figure 14:
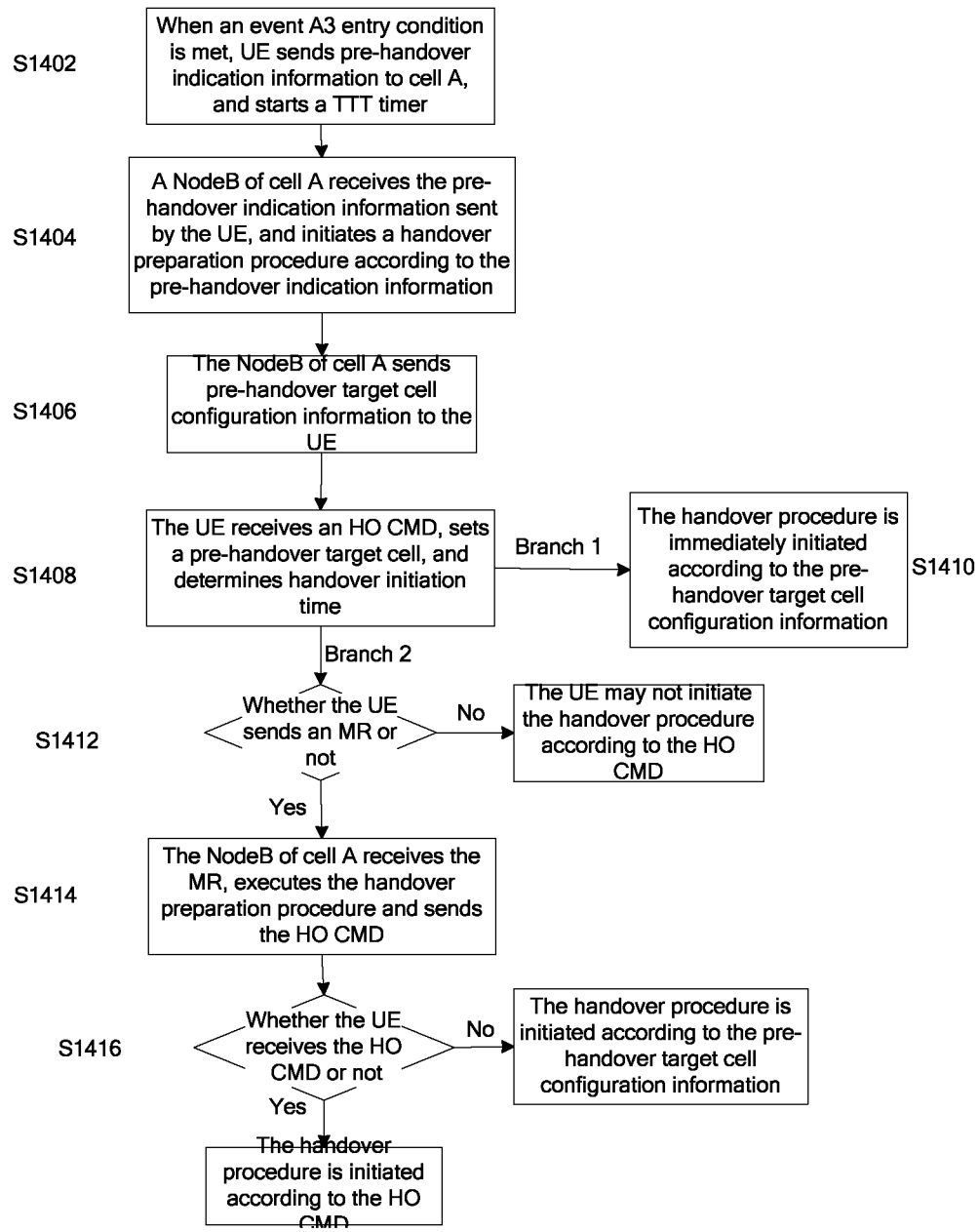
FIG. 14 is a flowchart of a method for processing pre-handover according to a first example implementation mode of the disclosure.

First Example Implementation Mode:

FIG. 14 is a flowchart of a method for processing pre-handover according to a first example implementation mode of the disclosure. As shown in FIG. 14, in the example implementation mode, UE is located in cell A, cell A is a serving cell of the UE, and a physical layer of the UE measures all cells which may be detected by the UE, and initiates a handover procedure according to a measurement result. The flow includes the following steps:

Step 1402: the UE measures neighbouring cells, and when a certain neighbouring cell fulfills an event A3 entry condition, starts a TTT timer, and sends pre-handover indication information to cell A.

Wherein, the pre-handover indication information sent by the UE may be one of the following contents or any combination of the following contents: an identifier of an neighbouring cell fulfilling the event A3 entry condition; measurement result information of the neighbouring cell fulfilling the event A3 entry condition; a cell type of the neighbouring cell fulfilling the event A3 entry condition; and measurement result information of cell A.

Wherein, the measurement result information of the neighbouring cell fulfilling the event A3 entry condition may include at least one of: measurement result information of all neighbouring cells fulfilling the event A3 entry condition; measurement result information of neighbouring cells with optimal measurement results in all the neighbouring cells fulfilling the event A3 entry condition; and measurement result information of a preset number of neighbouring cells with optimal measurement results in the neighbouring cells fulfilling the event A3 entry condition.

Step 1404: a NodeB of cell A receives the pre-handover indication information sent by the UE, and initiates a handover preparation procedure according to the pre-handover indication information.

After receiving the pre-handover indication information sent by the UE, the NodeB of cell A initiates the handover preparation procedure according to neighbouring cell information included in the pre-handover indication information. Wherein, a specific processing process may be at least one of: for the neighbouring cell information included in the pre-handover indication information, the NodeB of cell A respectively initiates the handover preparation procedures with all the neighbouring cells; the NodeB of cell A only initiates the handover preparation procedures with a preset number of neighbouring cells with highest signal quality; and the NodeB of cell A only initiates handover preparation procedures with a specific type of neighbouring cells.

Step 1406: the NodeB of cell A generates and sends pre-handover target cell configuration information to the UE.

In the first example implementation mode, after finishing the handover preparation procedure with the neighbouring cell, cell A generates the pre-handover target cell configuration information according to information acquired from the neighbouring cells, and sends the pre-handover target cell configuration information to the UE. Wherein, the pre-handover target cell configuration information may include at least one or any combination of the following contents: configuration information of the UE in each neighbouring cell finishing the handover preparation procedure with cell A; configuration information of the UE in a preset number of neighbouring cells finishing the handover preparation procedures with the serving cell; and time indication information of handover procedure initiation of the UE, wherein the time indication information of handover procedure initiation of the UE is used for indicating the UE to autonomously determine specific time for initiating the handover procedure.

Step 1408: the UE receives the pre-handover target cell configuration information, sets a pre-handover target cell, and determines handover initiation time.

In the first example implementation mode, when the pre-handover target cell configuration information includes configuration of only one cell, the UE sets the cell as the pre-handover target cell; and when the pre-handover target cell configuration information includes configuration of more than one cell, the UE randomly selects one from the more than one cell as the pre-handover target cell, or selects the cell with the highest signal strength as the pre-handover target cell according to quality of a measurement signal.

In the first example implementation mode, there may exist the following two conditions about the time indication information: the first condition is that the time indication information is included in the pre-handover target cell configuration information, and indicates the UE to autonomously determine the handover initiation time; and the second condition is that there is no time indication information in the pre-handover target cell configuration information.

Based on the abovementioned two conditions, the UE may immediately initiate handover operation, namely executes Step 1410, or judges whether to and how to execute a handover procedure according to a sending condition of an MR: when the UE has not sent the MR, Step 1412 is execute, and when the UE has sent the MR, Step 1414 is executed.

Step 1410: the UE immediately initiates the handover procedure to the pre-handover target cell immediately after receiving the pre-handover target cell configuration information.

Step 1412: when the UE has not sent the MR, the UE may not initiate the handover operation.

In the first example implementation mode, the UE has not sent the MR all the time, that is, measurement results, obtained by the UE, of all the neighbouring cells don't always fulfill the event A3 entry condition during operation of the TTT timer, the UE does not initiate the handover procedure, that is, the UE may not initiate the handover procedure according to the pre-handover target cell configuration information.

Step 1414: the NodeB of cell A receives the MR, executes the handover preparation procedure and sends an HO CMD.

In the first example implementation mode, after receiving the MR sent by the UE, the NodeB of cell A may execute the handover preparation procedure and send the HO CMD according to a result, wherein the handover preparation procedure may include at least one of the following two conditions:

when neighbouring cell information included in the MR is overlapped with the neighbouring cell information included in the pre-handover indication information, for the overlapped neighbouring cell information, the NodeB of cell A may not execute a new handover preparation procedure but generate the HO CMD according to the result of the handover preparation procedure in the pre-handover procedure; and no matter whether the neighbouring cell information included in the MR is overlapped with the neighbouring cell information included in the pre-handover indication information or not, the NodeB of cell A may initiate a new handover preparation procedure according to the neighbouring cell information in the MR and generate the HO CMD according to the result of the process.

Step 1416: the UE has sent the MR, and initiates the handover procedure according to a receiving result of the HO CMD.

In the first example implementation mode, the UE finally sends the MR, that is, the measurement results, obtained by the UE, of the neighbouring cells always fulfil the event A3 entry condition during operation of the TTT timer, the UE waits to receive the HO CMD:

when the UE receives the HO CMD, the UE initiates the handover procedure according to the HO CMD;

when the UE does not correctly receive the HO CMD: when a pre-handover target cell included in the MR is also included in the pre-handover target cell configuration information, the UE determines the cell as the target cell, and initiates the handover procedure according to a content included in the pre-handover target cell configuration information; or, the UE initiates the handover procedure to a pre-handover target cell which is set before according to the pre-handover target cell configuration information.

In the first example implementation mode, the condition that the UE does not correctly receive the HO CMD may include at least one of the following conditions: the UE does not receive the HO CMD within a preset time; and the UE receives the HO CMD, but does not correctly acquire a content included in the HO CMD.

In the first example implementation mode, the NodeB of the cell involved in the pre-handover procedure reserves a context of a UE, and a resource pre-reserved for the UE within a preset time, after the preset time, the cell releases the reserved resource and deletes the UE context, or only releases the reserved resource, but keeps the UE context.

Figure 15:
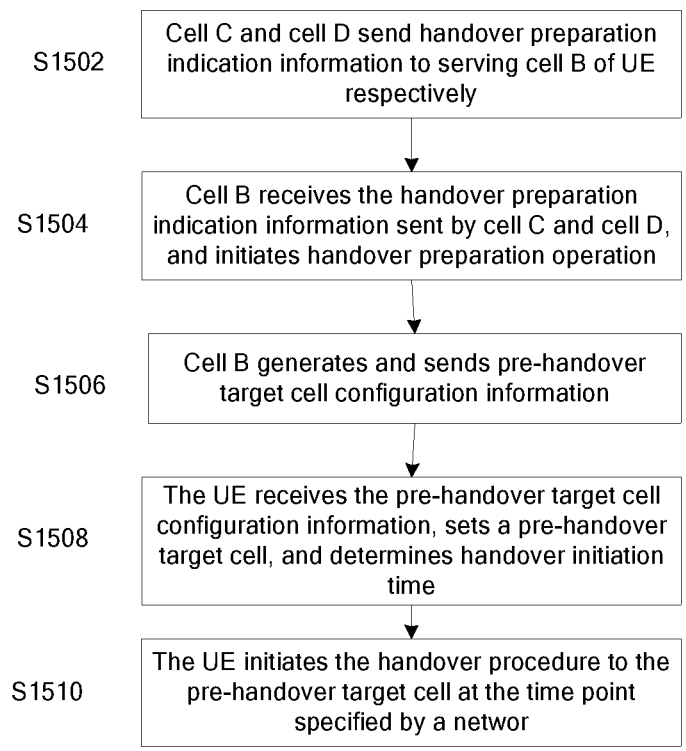
FIG. 15 is a flowchart of a method for processing pre-handover according to a second example implementation mode of the disclosure.

FIG. 15 is a flowchart of a method for processing pre-handover according to a second example implementation mode of the disclosure. As shown in FIG. 15, in the example implementation mode, UE is located in cell B, cell B is a serving cell of the UE, and cell C and cell D are two neighbouring cells of cell B. Wherein, cell C and cell D may prejudge movement of the UE according to own algorithms or own measurement over the UE. A pre-handover procedure includes the following steps:

Step 1502: cell C and cell D send handover preparation indication information to serving cell B of the UE respectively.

In the second example implementation mode, cell C and cell D may prejudge the movement of the UE according to own algorithms or own measurement over the UE and send the handover preparation indication information to the serving cell of the UE. Wherein, the handover preparation indication information is configured to notify cell B that a specific UE within a coverage of cell B may enter the cells which send the handover preparation indication information.

In the example implementation mode, cell C and cell D may simultaneously send their own handover preparation indication information, and may also sequentially send the handover preparation indication information.

In the example implementation mode, the handover preparation indication information sent by each neighbouring cell may be one or any combination of the following contents: an identifier of the UE; an identifier of the neighbouring cell; a type of the neighbouring cell; signal strength information of the neighbouring cell; and a handover preparation triggering identifier.

Step 1504: cell B receives the handover preparation indication information sent by cell C and cell D, and initiates handover preparation operation.

In the second example implementation mode, after receiving the handover preparation indication information from cell C and cell D, cell B may initiate handover preparation procedures with the two cells regardless of a receiving sequence of the handover preparation indication information respectively.

Step 1506: cell B generates and sends pre-handover target cell configuration information.

In the example implementation mode, after finishing the handover preparation procedure with cell C and cell D, cell B generates the pre-handover target cell configuration information according to results of the two handover preparation procedures, that is, the pre-handover target cell configuration information includes configuration information of the UE in cell C and configuration information of the UE in cell D.

In addition, in the second example implementation mode, the pre-handover target cell configuration information includes time indication information of a handover procedure, that is, a specific time point that is the time indication information used for initiating the handover procedure is indicated to the UE.

Step 1508: the UE receives the pre-handover target cell configuration information, sets a pre-handover target cell, and determines handover initiation time.

In the second example implementation mode, when the pre-handover target cell configuration information includes configuration information of the two cells (cell C and cell D), the UE randomly selects one of the two cells as the pre-handover target cell, or selects the cell with highest signal strength as the pre-handover target cell according to quality of a measurement signal. When the pre-handover target cell configuration information includes the configuration information of only one cell, the UE sets the cell as the pre-handover target cell. In the second example implementation mode, the UE determines cell C as the pre-handover target cell.

In the second example implementation mode, the pre-handover target cell configuration information specifies the specific time point of handover initiation, and then the UE initiates handover operation at the specific time point, namely executes Step 1510.

Step 1510: the UE initiates the handover procedure to the pre-handover target cell at the time point specified by a network.

In the second example implementation mode, the UE initiates the handover operation to the selected pre-handover target cell (cell C) at the time point specified by the network according to the pre-handover target cell configuration information.

In the second example implementation mode, after the UE finishes the handover procedure and enters cell C, cell B sends indication information to cell D, and after receiving the indication information, cell D releases a resource reserved in the handover preparation procedure, and deletes a UE context, or only releases the reserved resource, but keeps the UE context.

Figure 16:
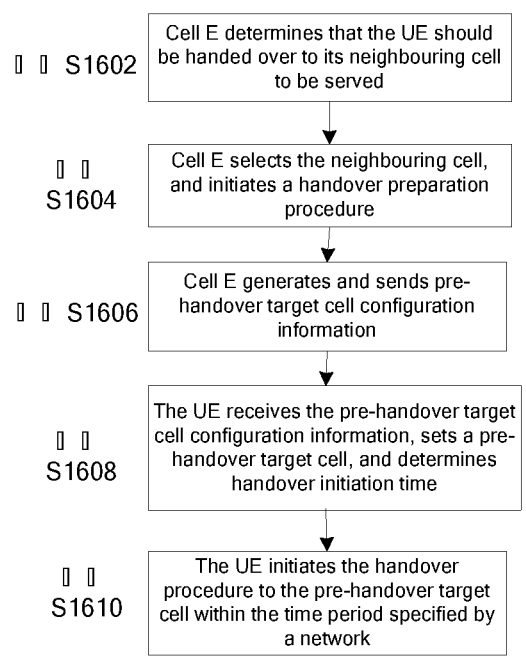
FIG. 16 is a flowchart of a method for processing pre-handover according to a third example implementation mode of the disclosure.

FIG. 16 is a flowchart of a method for processing pre-handover according to a third example implementation mode of the disclosure. As shown in FIG. 16, in the third example implementation mode, cell E is a serving cell of UE, cell F is a neighbouring cell of cell E, the UE is located within a coverage of cell E, and its position is close to an edge of cell E and close to cell F. In the example implementation mode, serving cell E of the UE prejudges movement of a specific UE according to mobility statistic information of the UE, and may also hand over the UE which is located on the edge of the cell or in an overlapped coverage area into a corresponding neighbouring cell according to own load condition. The flow includes the following steps:

Step 1602: cell E determines that the UE should be handed over to its neighbouring cell to be served.

In the third example implementation mode, for the UE on the edge of cell E, cell E determines that the serving cell of the UE should be changed to make the UE served by the neighbouring cell of cell E according to mobility statistic information, obtained by the UE itself, of the UE or own load condition.

Step 1604: cell E selects the neighbouring cell, and initiates a handover preparation procedure.

In the third example implementation mode, the UE is close to the edge of cell E and close to cell F, so that cell E selects cell F, and initiates the handover preparation procedure with cell F.

Step 1606: cell E generates and sends pre-handover target cell configuration information.

In the third example implementation mode, after finishing the handover preparation procedure with cell F, cell E generates the pre-handover target cell configuration information according to a result of the handover preparation procedure, that is, the pre-handover target cell configuration information includes configuration information of UE in cell F.

In addition, in the third example implementation mode, the pre-handover target cell configuration information includes time indication information of a handover procedure, that is, that the time indication information of initiation of the handover procedure is a specific time period when handover is allowed to be initiated is indicated to the UE.

Step 1608: the UE receives the pre-handover target cell configuration information, sets a pre-handover target cell, and determines handover initiation time.

In the third example implementation mode, the pre-handover target cell configuration information includes configuration information of only one cell (cell F), and then the UE sets cell F as the pre-handover target cell.

In the third example implementation mode, the pre-handover target cell configuration information specifies the specific time period for handover initiation, and then the UE initiates handover operation within the time period, namely executes Step 1610.

Step 1610: the UE initiates the handover procedure to the pre-handover target cell within the time period specified by a network.

In the third example implementation mode, the UE initiates the handover operation to the selected pre-handover target cell (cell F) within the time period specified by the network according to the pre-handover target cell configuration information. After the UE finishes the handover procedure, cell F becomes a new serving cell of the UE.

Obviously, those skilled in the art should know that each component or step of the disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, or under certain conditions, the shown or described steps may be executed in a sequence different from that described here, or the components or steps may form each integrated circuit component respectively, or multiple components or steps therein may form a single integrated circuit component for implementation. As a consequence, the disclosure is not limited to any specific hardware and software combination.

The above is only the example embodiment of the disclosure and not intended to limit the disclosure, and for those skilled in the art, the disclosure may have various modifications and variations. Any modifications, equivalent replacements, improvements and the like within the spirit and principle of the disclosure shall fall within the scope of protection of the disclosure.

INDUSTRIAL APPLICABILITY

By the solutions provided by the embodiments and example implementation modes of the disclosure, the problems of low handover success rate and poor handover robustness of inter-cell handover in the related technology are solved, and effects of enhancing robustness of inter-cell handover, increasing a success rate of inter-cell handover and improving network performance and a user experience are further achieved.

The invention claimed is:

1. A method for processing pre-handover, comprising:
   receiving, by User Equipment (UE) pre-handover target cell configuration information sent by a serving cell; and
   executing, by the UE, a pre-handover procedure according to the pre-handover target cell configuration information;
   wherein the UE executing a pre-handover procedure according to the pre-handover target cell configuration information comprises: the UE determines handover procedure initiation time and initiates a handover procedure according to the handover procedure initiation time;
   wherein the UE determines handover procedure initiation time and initiates a handover procedure according to the handover procedure initiation time comprises: judging whether the pre-handover target cell configuration information comprises handover time indication information or not; when the judgment result is that the pre-handover target cell configuration information does not comprise the handover time indication information, initiating, by the UE, the handover procedure according to handover procedure initiation time determined by the UE itself;
   wherein initiating, by the UE, the handover procedure according to the handover procedure initiation time determined by the UE itself comprises: initiating the handover procedure at handover procedure initiation time determined according to a sending condition of a Measurement Report (MR) and a receiving condition of a Handover Command (HO CMD).

2. The method as claimed in claim 1, wherein before receiving, by the UE, the pre-handover target cell configuration information sent by the serving cell, the method further comprises:
   sending, by the UE, pre-handover indication information to the serving cell, wherein the pre-handover indication information is used for triggering the serving cell to generate and send the pre-handover target cell configuration information to the UE.

3. The method as claimed in claim 2, wherein the pre-handover indication information comprises at least one of:
   identification information of a neighbouring cell fulfilling a measurement event entry condition;
   cell type information of a neighbouring cell fulfilling a measurement event entry condition;
   measurement result information of a neighbouring cell fulfilling a measurement event entry condition; and
   measurement result information of the serving cell of the UE.

4. The method as claimed in claim 1, wherein the UE determines handover procedure initiation time and initiates a handover procedure according to the handover procedure initiation time further comprises:
   when a judgment result is that the pre-handover target cell configuration information comprises the handover time indication information, initiating, by the UE, the handover procedure according to the handover time indication information.

5. The method as claimed in claim 4, wherein
   the handover time indication information comprises at least one of: time point information of initiation of the handover procedure and time period information of initiation of the handover procedure.

6. The method as claimed in claim 1, wherein
   initiating the handover procedure at the handover procedure initiation time determined according to the sending condition of the MR and the receiving condition of the HO CMD comprises: judging whether the UE has sent the MR or not; and when a judgment result indicates that the UE has not sent the MR, not initiating the handover procedure;
   or,
   initiating the handover procedure at the handover procedure initiation time determined according to the sending condition of the MR and the receiving condition of the HO CMD comprises: judging whether the UE has sent the MR or not; when a judgment result indicates that the UE has sent the MR, judging whether the UE correctly receives the HO CMD or not; when a judgment result indicates that the UE correctly receives the HO CMD, initiating the handover procedure after the HO CMD is processed; and/or, when the judgment result indicates that the UE does not correctly receive the HO CMD, initiating the handover procedure according to the pre-handover target cell configuration information.

7. The method as claimed in claim 6, wherein a condition that the UE does not correctly receive the HO CMD comprises at least one of that:
   the UE does not receive the HO CMD within a preset time period; and
   the UE receives the HO CMD, but does not correctly acquire an information content comprised in the HO CMD.

8. A User Equipment (UE), comprises a hardware processor and a memory, and the hardware processor is configured to execute program components stored on the memory, the program components comprising:
   a receiving component, configured for User Equipment, UE, to receive pre-handover target cell configuration information sent by a serving cell; and
   a first executing component, configured to execute a pre-handover procedure according to the pre-handover target cell configuration information; further configured to determine handover procedure initiation time and initiate a handover procedure according to the handover procedure initiation time;
   the first executing component comprises: a Judging element, configured to judge whether the pre-handover target cell configuration information comprises handover time indication information or not: a first initiating element, configured for the UE to, when the judgement result of the Judgement element is that the pre-handover target cell configuration information does not compromise the handover time indication information, initiate the handover procedure according to handover procedure initiation time determined by the UE itself;
   the first initiating element comprises: a first initiating sub-element, configured to initiate the handover procedure at handover procedure initiation time determined according to a sending condition of a Measurement Report (MR), and a receiving condition of a Handover Command (HQ CMD).

9. The UE as claimed in claim 8, further comprising:
a first sending component, configured for the UE to send pre-handover indication information to the serving cell, wherein the pre-handover indication information is used for triggering the serving cell to generate and send the pre-handover target cell configuration information to the UE.

10. The UE as claimed in claim 8, wherein the first executing component further comprises:
   a second initiating element, configured for the UE to, when a judgment result of the Judging element is that the pre-handover target cell configuration information comprises the handover time indication information, initiate a handover procedure according to the handover time indication information.

11. The UE as claimed in claim 10, wherein the first initiating element further comprises:
   a second initiating sub-element, configured to initiate the handover procedure immediately when the pre-handover target cell configuration information is received.

12. The UE as claimed in claim 11, wherein the first initiating sub-element comprises:
   a first secondary judging sub-element, configured to judge whether the UE has sent the MR or not;
   a second secondary judging sub-element, configured to, when a judgment result indicates that the UE has sent the MR, judge whether the UE correctly receives the HO CMD or not;
   a first secondary initiating sub-element, configured to, when a judgment result indicates that the UE correctly receives the HO CMD, initiate the handover procedure after the HO CMD is processed; and/or,
   a second secondary initiating sub-element, configured to, when the judgment result indicates that the UE does not correctly receive the HO CMD, initiate the handover procedure according to the pre-handover target cell configuration information.

* * * * *